Sept. 12, 1950    E. R. SMITH    2,522,142
AIR-OPERATED ROTATING DEVICE AND AIR SUPPLY AND
CONTROL MECHANISM THEREFOR
Filed Dec. 8, 1948
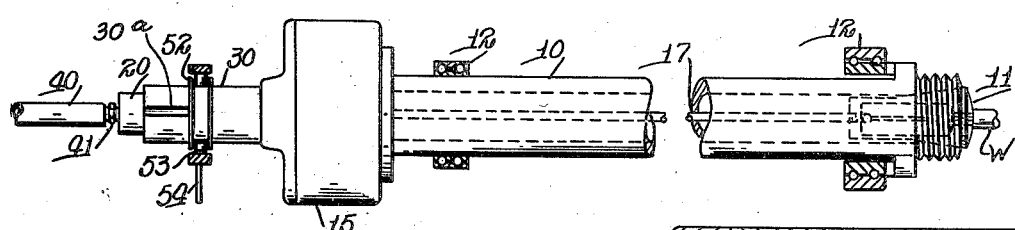
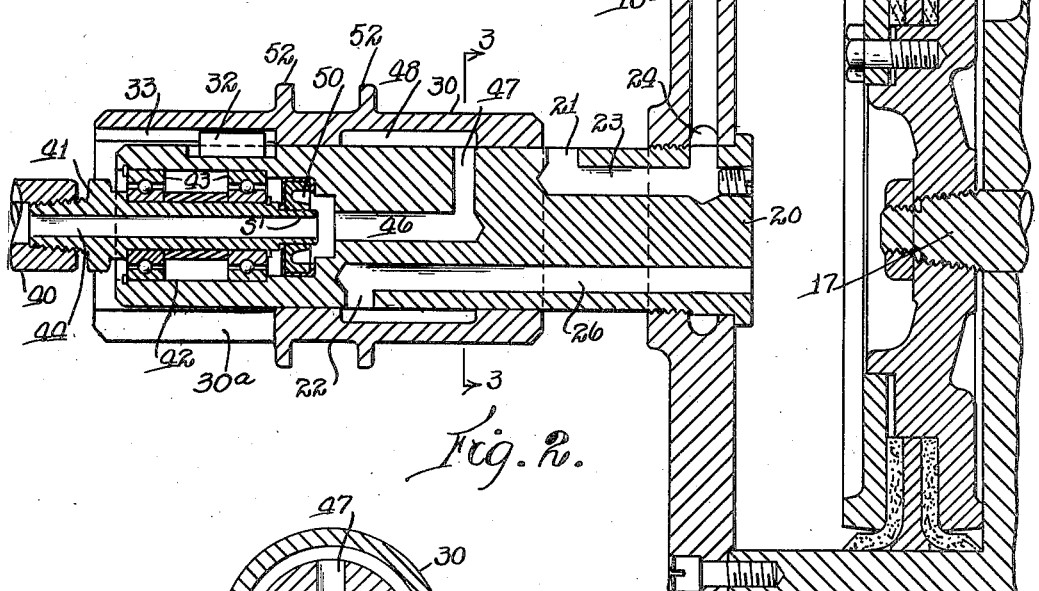
INVENTOR.
Edwin R. Smith.
BY
Chas. T. Hawley
Attorney.

Patented Sept. 12, 1950

2,522,142

UNITED STATES PATENT OFFICE 2,522,142

AIR-OPERATED ROTATING DEVICE AND AIR SUPPLY AND CONTROL MECHANISM THEREFOR

Edwin R. Smith, Seneca Falls, N. Y., assignor to Seneca Falls Machine Company, Seneca Falls, N. Y., a corporation of Massachusetts Application December 8, 1948, Serial No. 64,092

5 Claims. (Cl. 121—38)

This invention relates to machines in which a rotating device, such as a work holder, is operated by compressed air from a stationary air supply. The rotative speeds of such devices are now very high, and the maintenance of satisfactory air connections and air control presents serious difficulties.

It is the general object of my present invention to provide an improved construction effective to connect a stationary air supply to a rotating air-operated device, and to control the air distribution in said device.

More specifically, I provide a control member which rotates with a work spindle or other rotating device and which is axially slidable to control the air distribution in the rotating device. I also provide an air supply member of relatively small diameter and a correspondingly small packing device associated therewith, so that the relative speed of the frictionally-engaged surfaces is greatly reduced over the present practice.

My invention further relates to arrangements and combinations of parts which will be hereinafter described and more particularly pointed out in the appended claims.

A preferred form of the invention is shown in the drawings, in which

Fig. 1 is a side elevation showing my invention embodied in a work spindle;

Fig. 2 is an enlarged sectional elevation of certain parts shown in the left-hand portion of Fig. 1; and Fig. 3 is a transverse sectional elevation, taken along the line 3—3 in Fig. 2.

Referring to Fig. 1, I have shown my invention as embodied in a machine tool having a work spindle 10 rotated in any convenient matter, a collet chuck 11 for a piece of work W, bearings 12 for the work spindle, and an air cylinder 15 rotating with the work spindle and containing a slidable piston 16 conected by a draw-bar 17 to the collet 11. As air is admitted to one side or the other of the piston 16, the chuck 11 is opened or closed.

The parts thus far described are of usual commercial construction and in themselves form no part of my present invention, which relates to the delivery and control of air for the cylinder 15.

The cylinder 15 supports a short shaft 20 extending rearward therefrom and provided with ports 21 and 22. The port 21 is connected through a longitudinal passage 23, an annular passage 24 and a radiating passage 25 to the right-hand end of the cylinder 15 (as viewed in Fig. 2) and the port 22 is similarly connected by a longitudinal passage 26 to the left-hand end of the cylinder.

A control sleeve 30 is mounted on and rotates with the shaft 20 and is a close sliding fit thereon. The sleeve 30 may be slidably connected to the shaft 20 by a key 32 mounted in the shaft and coacting with a keyway 33 in the sleeve. The sleeve 30 is longitudinally slotted at its left-hand end as indicated at 30a.

Compressed air is delivered through a pipe 40 to a non-rotating member 41 which extends into an axial recess 42 in the outer end of the shaft 20 and which is axially supported in said recess by anti-friction bearings 43. An axial passage 44 in the member 41 connects the pipe 40 to an axial passage 46 in the shaft 20, and the passage 46 is connected by a cross passage 47 to an annular recess 48 in the sliding sleeve 30.

A cup washer or other suitable packing 50 is mounted within the shaft 20 and engages a reduced end portion 51 of the member 44. Flanges 52 may be provided on the outside of the sleeve 30 for engagement by rolls 53 on a yoke or other shifting device 54.

When the sleeve 30 is in the position shown in Fig. 2, compressed air will be admitted through the pipe 40, aligned axial passages 44 and 46, cross passage 47, annular recess 48, port 22 and connecting passage 26 to the left-hand end of the cylinder 15. At the same time the cylinder space at the right of the piston 16 will be connected to the atmosphere through the passages 25, 24 and 23 and the port 21. The piston 16 will thus be moved to the right to open the chuck 11 and release the work.

If the sleeve 30 is shifted to the right in Fig. 2, the annular recess 48 will be connected through the port 21 and passages 23, 24 and 25 to the right-hand side of the piston 16, and the port 22 will be opened to the atmosphere. The piston 16 will then be moved to the left in Figs. 1 and 2, thus closing the chuck 11 on the work W.

It will be noted that the sleeve 30 rotates with the shaft 20, so that there are no relatively rotating valve parts, and it will be further noted that the packing 50 is frictionally rotated relative only to the reduced end portion 51 of the fixed member 41. The surfaces thus engaged are of such small diameter that the rate of relative linear movement is low, even when the work spindle and associated parts are rotated at high speed.

Having thus described my invention and the advantages thereof, I do not wish to be limited to the details herein disclosed, otherwise than as set forth in the claims, but what I claim is:

1. Air supply and control mechanism for a rotating air-operated device comprising an axial member rotating with said device, a sleeve mounted to slide on said axial member but non-rotatable relative thereto and having an annular recess therein which is open on its inner side, means to supply air under pressure to said recess in all axial operative positions of said sleeve, axially spaced ports in said axial member, and connections from said ports to said air-operated device, and said sleeve alternately connecting a selected one of said ports to said recess and air supply and the other port to the atmosphere.

2. Air supply and control mechanism for a rotating air-operated device comprising an axial member rotating with said device, non-rotatable axial means to supply air under pressure to an axial supply passage in said axial member, said member having two additional longitudinal passages therein connecting to said air-operated device, a valve member slidable on said axial member and rotated therewith, and means to move said valve member to alternately connect one of said additional connecting passages to said supply passage and the other connecting passage to the atmosphere.

3. The combination in air supply and control mechanism as set forth in claim 2, in which the axial member has axially spaced peripheral ports for said additional connecting passages, and in which the valve member has an annular recess permanently connected to the air supply passage and alternately coacting with a selected port as said valve member is shifted axially.

4. The combination in air supply and control mechanism as set forth in claim 2, in which the axial member has axially spaced peripheral ports for said additional connecting passages, and in which the valve member has an annular recess permanently connected to the air supply passage and alternately coacting with a selected port as said valve member is shifted axially and the other port being simultaneously opened to the atmosphere.

5. Air supply and control mechanism for a rotating air-operated device comprising an axial member rotating with said device and having an axial air-admitting passage, means to continuously supply air under pressure to said passage, two separate air connections from said axial member to said air-operated device, axially shiftable valve means rotating with said air-operated device and effective to connect said air-admitting passage to a selected air connection by axial shifting thereof, and means to shift said valve means.

EDWIN R. SMITH.

REFERENCES CITED

The following references are of record in the file of this patent:

UNITED STATES PATENTS

| Number | Name | Date |
|--------|------|------|
| 806,168 | Morrison | Dec. 5, 1905 |
| 1,024,882 | Domizi | Apr. 30, 1912 |
| 1,284,225 | Bogart | Nov. 12, 1918 |
| 1,785,349 | Hopkins | Dec. 16, 1930 |